United States Patent
Pan

(10) Patent No.: US 11,941,864 B2
(45) Date of Patent: Mar. 26, 2024

(54) IMAGE FORMING APPARATUS, DETERMINATION APPARATUS, IMAGE FORMING METHOD, AND NON-TRANSITORY COMPUTER READABLE MEDIUM STORING IMAGE FORMING PROGRAM

(71) Applicant: NEC Corporation, Tokyo (JP)

(72) Inventor: Yadong Pan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 280 days.

(21) Appl. No.: 17/434,109

(22) PCT Filed: Mar. 1, 2019

(86) PCT No.: PCT/JP2019/007986
§ 371 (c)(1),
(2) Date: Aug. 26, 2021

(87) PCT Pub. No.: WO2020/178876
PCT Pub. Date: Sep. 10, 2020

(65) Prior Publication Data
US 2022/0139007 A1    May 5, 2022

(51) Int. Cl.
*G06F 18/2431* (2023.01)
*G06T 7/11* (2017.01)
*G06T 7/70* (2017.01)
*G06T 11/00* (2006.01)
(Continued)

(52) U.S. Cl.
CPC ........ *G06V 10/764* (2022.01); *G06F 18/2431* (2023.01); *G06T 7/11* (2017.01);
(Continued)

(58) Field of Classification Search
CPC . G06T 2207/30201; G06T 2207/20132; G06T 2207/20084; G06T 11/203;
(Continued)

(56) References Cited

U.S. PATENT DOCUMENTS

| | | |
|---|---|---|
| 2010/0002908 A1 | 1/2010 | Miyamoto et al. |
| 2012/0045132 A1 | 2/2012 | Wong et al. |

(Continued)

FOREIGN PATENT DOCUMENTS

| | | |
|---|---|---|
| CN | 102508867 A | 6/2012 |
| WO | 2010/135455 A1 | 11/2010 |

OTHER PUBLICATIONS

David G. Lowe, "Distinctive Image Features from Scale-Invariant Keypoints", International Journal of Computer Vision 60(2) 91-100, 2004. (Year: 2004).*

(Continued)

*Primary Examiner* — Sing-Wai Wu

(57) ABSTRACT

In an image forming apparatus (10), a feature extracted image forming unit (11) includes a line-drawing unit (11A). The line-drawing unit (11A) draws in an image to be processed, for each of a plurality of line-draw groups, a line that passes all the key points included in each of the line-draw groups and has at least one end that is extended to an end of the image to be processed, thereby forming a texture map. Each of the line-draw groups includes at least two key points included in the plurality of predetermined key points.

19 Claims, 15 Drawing Sheets

(51) Int. Cl.
   *G06T 11/20* (2006.01)
   *G06V 10/764* (2022.01)
   *G06V 10/774* (2022.01)
   *G06V 10/82* (2022.01)
   *G06V 40/16* (2022.01)
   *G06V 40/20* (2022.01)

(52) U.S. Cl.
   CPC .............. *G06T 7/70* (2017.01); *G06T 11/001* (2013.01); *G06T 11/203* (2013.01); *G06V 10/7747* (2022.01); *G06V 10/82* (2022.01); *G06V 40/171* (2022.01); *G06V 40/20* (2022.01); *G06T 2207/20084* (2013.01); *G06T 2207/20132* (2013.01); *G06T 2207/30201* (2013.01)

(58) Field of Classification Search
   CPC . G06T 11/001; G06T 7/11; G06T 7/70; G06F 18/2431; G06V 10/82; G06V 40/171
   See application file for complete search history.

(56) References Cited

U.S. PATENT DOCUMENTS

| | | | |
|---|---|---|---|
| 2013/0230211 | A1 | 9/2013 | Tanabiki et al. |
| 2019/0347826 | A1* | 11/2019 | Zhang ..................... G06N 3/08 |
| 2019/0355150 | A1* | 11/2019 | Tremblay ................. G06T 7/73 |
| 2020/0394393 | A1* | 12/2020 | Kraft ..................... G06V 40/10 |

OTHER PUBLICATIONS

International Search Report for PCT Application No. PCT/JP2019/007986, dated May 21, 2019.

M. Zolfaghari et al., "Chained multi-stream networks exploiting pose, motion, and appearance for action classification and detection", 2017 IEEE International Conference on Computer Vision (ICCV), Venice, Italy, Oct. 22-29, 2017.

JP Office Action for JP Application No. 2021-549130, dated Sep. 6, 2022 with English Translation.

* cited by examiner

| Location of Zone | | Color Code | |
|---|---|---|---|
| Zones under line II | Zone in the counterclockwise direction next to line I | #101010 | Use the only corresponding code |
| | One in the counterclockwise direction next to line III | #404040 | |
| | One in the counterclockwise direction next to line IV | #D0D0D0 | |
| | The rest zone | #707070 | |
| Zone above line II | Above line V | #202020 | Sum up all the corresponding codes |
| | Under line V | #505050 | |
| | Left side of line I | #A0A0A0 | |
| | Right side of line I | #606060 | |

Fig. 9

IMAGE FORMING APPARATUS, DETERMINATION APPARATUS, IMAGE FORMING METHOD, AND NON-TRANSITORY COMPUTER READABLE MEDIUM STORING IMAGE FORMING PROGRAM

This application is a National Stage Entry of PCT/JP2019/007986 filed on Mar. 1, 2019, the contents of all of which are incorporated herein by reference, in their entirety.

TECHNICAL FIELD

The present disclosure relates to an image forming apparatus, a determination apparatus, an image forming method, and an image forming program.

BACKGROUND ART

Techniques for human action classification (determination) using a neural network have been proposed (e.g., Non-Patent literature 1). In the technique disclosed in Non-Patent literature 1, a "human shaped image" is formed, and training of human shaped images is merged into a Convolutional Neural Network (CNN) that trains the images from a camera and their optical-flow for human action classification. The human shaped image used in the technique disclosed in Non-Patent literature 1 is an image painted with a certain color on each part of the human body (a part between two joints that have degrees of freedom or at a terminal of the human body).

CITATION LIST

Non Patent Literature

NPL 1: M. Zolfaghari et al., "Chained multi-stream networks exploiting pose, motion, and appearance for action classification and detection". in 2017 IEEE International Conference on Computer Vision (ICCV), pp. 2923-2932, IEEE.

SUMMARY OF INVENTION

Technical Problem

However, the aforementioned human shaped image used in the technique disclosed in Non-Patent literature 1 enhances the body' context rather than a specific pose's feature. Therefore, according to the technique disclosed in Non-Patent literature 1, it is possible that the human pose may not be accurately classified (determined).

An object of this disclosure is to provide an image forming apparatus, a determination apparatus, an image forming method, and an image forming program capable of improving the accuracy of determining the pose of the target to be determined.

Solution to Problem

An image forming apparatus according to a first aspect is an image forming apparatus including: forming means for forming a feature extracted image based on a plurality of predetermined key points of a target to be determined included in an image to be processed including a first image area in which the target to be determined of a pose is shown and a second image area that surrounds the first image data, the target to be determined not being shown in the second image area, in which the forming means includes line-drawing means for drawing in the image to be processed, for each of a plurality of line-draw groups, each of the line-draw groups including at least two key points included in the plurality of predetermined key points, a line that passes the key points included in each of the line-draw groups and has at least one end that is extended to an end of the image to be processed, thereby forming a texture map.

An image forming method according to a second aspect is an image forming method including: forming a feature extracted image based on a plurality of predetermined key points of a target to be determined included in an image to be processed including a first image area in which the target to be determined of a pose is shown and a second image area that surrounds the first image data, the target to be determined not being shown in the second image area, in which forming the feature extracted image includes drawing in the image to be processed, for each of a plurality of line-draw groups, each of the line-draw groups including at least two key points included in the plurality of predetermined key points, a line that passes the key points included in each of the line-draw groups and has at least one end that is extended to an end of the image to be processed, thereby forming a texture map.

An image forming program according to a third aspect is an image forming program causing an image forming apparatus to form a feature extracted image based on a plurality of predetermined key points of a target to be determined included in an image to be processed including a first image area in which the target to be determined of a pose is shown and a second image area that surrounds the first image data, the target to be determined not being shown in the second image area, in which forming the feature extracted image includes drawing in the image to be processed, for each of a plurality of line-draw groups, each of the line-draw groups including at least two key points included in the plurality of predetermined key points, a line that passes the key points included in each of the line-draw groups and has at least one end that is extended to an end of the image to be processed, thereby forming a texture map.

Advantageous Effects of Invention

According to this disclosure, it is possible to provide an image forming apparatus, a determination apparatus, an image forming method, and an image forming program capable of improving the accuracy of determining the pose of the target to be determined.

BRIEF DESCRIPTION OF DRAWINGS

FIG. 9 is a diagram showing one example of a painting rule table.

DESCRIPTION OF EMBODIMENTS

Specific embodiments are described hereinafter in detail with reference to the drawings. The same or corresponding elements are denoted by the same reference symbols in the embodiments, and repetitive descriptions are avoided.

First Embodiment

Figure 1:
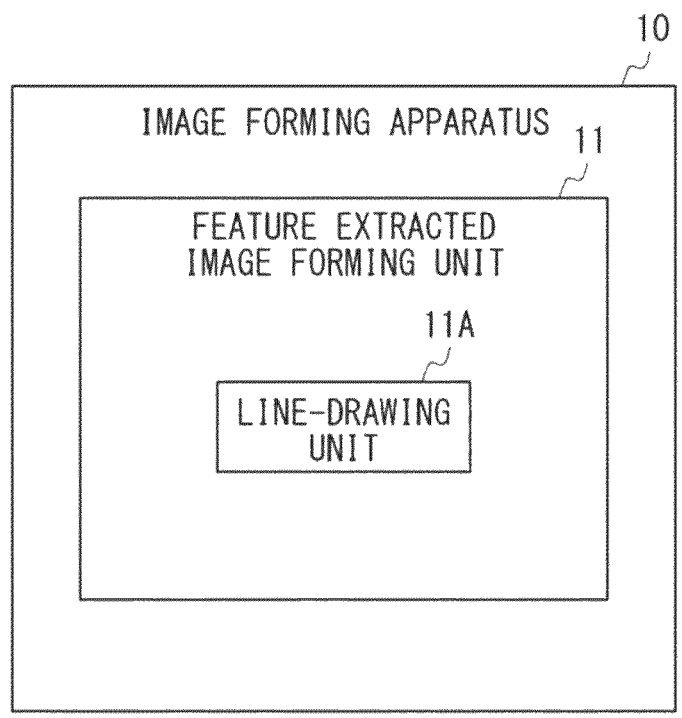
FIG. 1 is a block diagram showing one example of an image forming apparatus according to a first embodiment.

FIG. 1 is a block diagram showing one example of an image forming apparatus according to a first embodiment. In FIG. 1, an image forming apparatus 10 includes a feature extracted image forming unit 11. In the following description, the feature extracted image forming unit 11 may be simply referred to as an "image forming unit 11".

The image forming unit 11 forms a "feature extracted image" based on a plurality of predetermined "key points" of a target to be determined regarding a pose included in an "image to be processed".

The target to be determined is, for example, a human. Further, the "image to be processed" includes a "first image area" in which the target to be determined is shown and a "second image area" that surrounds the first image area, the target to be determined not being shown in the second image area. That is, the image to be processed includes, for example, besides the image of the target to be determined (first image area), the image that corresponds to the background of the target to be determined (second image area). Further, the image to be processed is, for example, a "normalized image" extracted from the captured image of the target to be determined captured by an image-capturing apparatus (not shown).

Further, the aforementioned plurality of predetermined "key points" are a plurality of key points in accordance with a pose to be determined. The plurality of key points may be, for example, some of key points used in "OpenPose" developed by Carnegie Mellon University (CMU).

Figure 2:
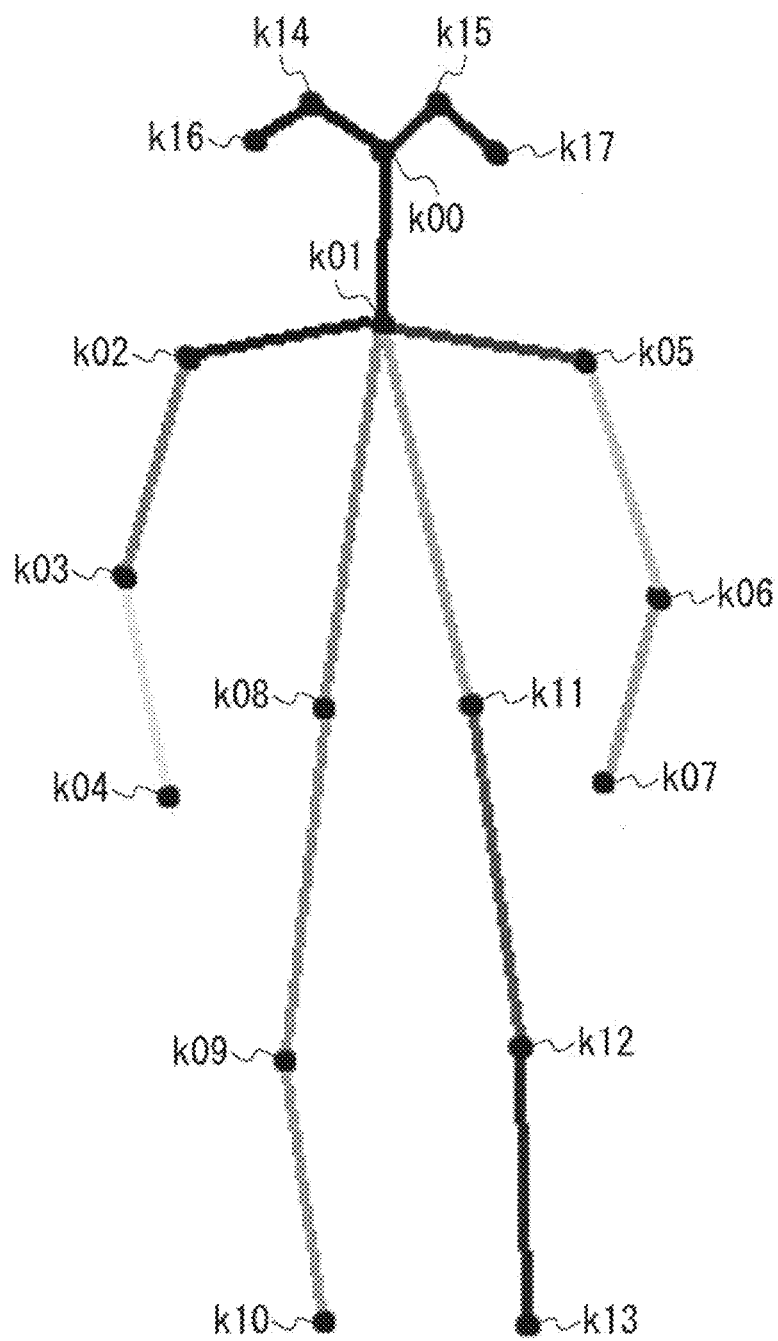
FIG. 2 is a diagram for explaining key points used in OpenPose.

FIG. 2 is a diagram for explaining the key points used in OpenPose. As shown in FIG. 2, in OpenPose, key points k00-k17 are used. The key point k00 corresponds to the nose. The key point k01 corresponds to the neck. The key point k02 corresponds to the right shoulder. The key point k03 corresponds to the right elbow. The key point k04 corresponds to the right wrist. The key point k05 corresponds to the left shoulder. The key point k06 corresponds to the left elbow. The key point k07 corresponds to the left wrist. The key point k08 corresponds to the right hip. The key point k09 corresponds to the right knee. The key point k10 corresponds to the right ankle. The key point k11 corresponds to the left hip. The key point k12 corresponds to the left knee. The key point k13 corresponds to the left ankle. The key point k14 corresponds to the right eye. The key point k15 corresponds to the left eye. The key point k16 corresponds to the right ear. The key point k17 corresponds to the left ear.

With reference once again to FIG. 1, the image forming unit 11 includes a line-drawing unit 11A. The line-drawing unit 11A forms a "texture map" using the image to be processed. The line-drawing unit 11A draws, for example, for each of a plurality of "line-draw groups", the line that passes all the key points included in each of the line-draw groups and has at least one end that is extended to the end of the image to be processed, thereby forming a texture map. Each "line-draw group" includes at least two key points included in the aforementioned plurality of predetermined key points.

That is, in the texture map thus formed, a plurality of lines, each having one end protruded from the body part of the target to be determined and being extended to the end of the image to be processed, are drawn. Accordingly, the feature of the pose of the target to be determined, not the feature of the body (main body) of the target to be determined, can be emphasized in the texture map. Accordingly, by determining the pose of the target to be determined using the feature extracted image based on the texture map, it is possible to improve the accuracy of determining the pose.

As described above, according to the first embodiment, in the image forming apparatus 10, the feature extracted image forming unit 11 includes the line-drawing unit 11A. The line-drawing unit 11A draws, in the image to be processed, for each of the plurality of "line-draw groups", the line that passes all the key points included in each of the line-draw groups and has at least one end that is extended to the end of the image to be processed, thereby forming a texture map. Each "line-draw group" includes at least two key points included in the aforementioned plurality of predetermined key points.

According to the configuration of the image forming apparatus 10, it is possible to form a texture map in which the feature of the pose of the target to be determined (that is, a spatial feature in the pose of the target to be determined), not the feature of the body (main body) of the target to be determined, is emphasized. By determining the pose of the target to be determined using the feature extracted image based on this texture map, it is possible to improve the accuracy of determining the pose.

Second Embodiment

A second embodiment relates to a more specific embodiment.

Configuration Example of Image Forming Apparatus

Figure 3:
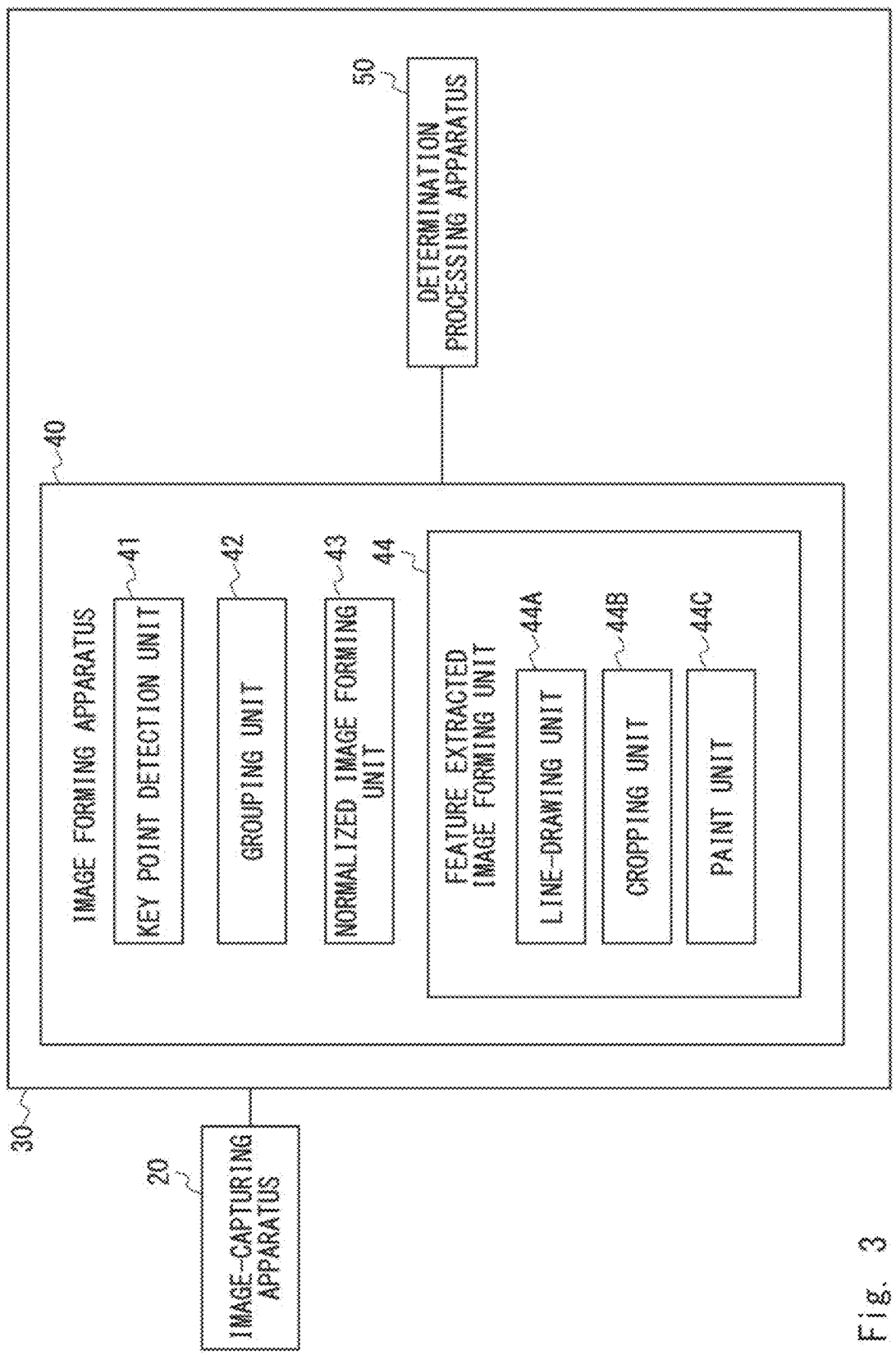
FIG. 3 is a block diagram showing one example of a determination apparatus including an image forming apparatus according to a second embodiment.

FIG. 3 is a block diagram showing one example of a determination apparatus including an image forming apparatus according to the second embodiment. FIG. 3 shows, besides a determination apparatus 30 according to the second embodiment, an image-capturing apparatus 20.

Figure 4:
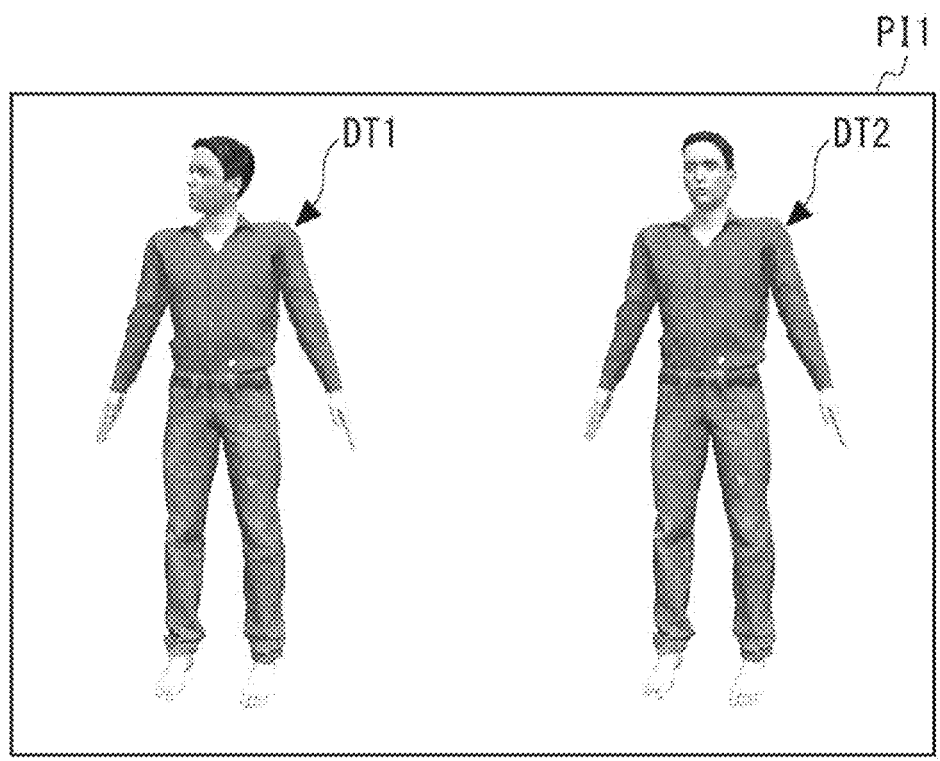
FIG. 4 is a diagram showing one example of a captured image.

The image-capturing apparatus 20 outputs the captured image to the determination apparatus 30. FIG. 4 is a diagram showing one example of the captured image. A captured image PH in FIG. 4 shows images of two persons. That is, the captured image PH includes an image of a target to be determined DT1 and an image of a target to be determined DT2.

The determination apparatus 30 includes an image forming apparatus 40 and a determination processing apparatus (determination means) 50.

The image forming apparatus 40 includes a key point detection unit 41, a grouping unit 42, a normalized image forming unit 43, and a feature extracted image forming unit 44. In the following description, the feature extracted image forming unit 44 may be simply referred to as an "image forming unit 44".

The key point detection unit 41 detects key points of the target to be determined in the captured image received from the image-capturing apparatus 20. It is assumed here that the key points to be detected are the aforementioned key points used in OpenPose.

The grouping unit 42 selects the aforementioned plurality of predetermined key points from the key points that have been detected and groups the plurality of key points that have been selected into the aforementioned plurality of line-draw groups.

The pose to be determined is referred to as a "kyoro pose". In this specification, one pose included in predetermined motions of a human expressed as "kyoro-kyoro" in Japanese is referred to as a "kyoro pose". The predetermined motion expressed as "kyoro-kyoro" means shaking one's head to look somewhere else rather than the forward direction. Therefore, the "kyoro pose" can be defined to be an instant pose when head orientation is different from body orientation. For example, suspicious persons tend to perform the motion "kyoro-kyoro". Therefore, the "kyoro pose" can be used, for example, as a feature for specifying suspicious persons in public spaces.

When the pose of the target to be determined is the "kyoro pose", a plurality of line-draw groups can be defined, for example, as follows. That is, a "line-draw group 1" includes the key points k00 and k01. A "line-draw group 2" includes the key points k01, k02, and k05. A "line-draw group 3" includes the key points k01 and k09. A "line-draw group 4" includes the key points k01 and k12. A "line-draw group 5" includes the key points k00, k16, and k17.

Figure 5:
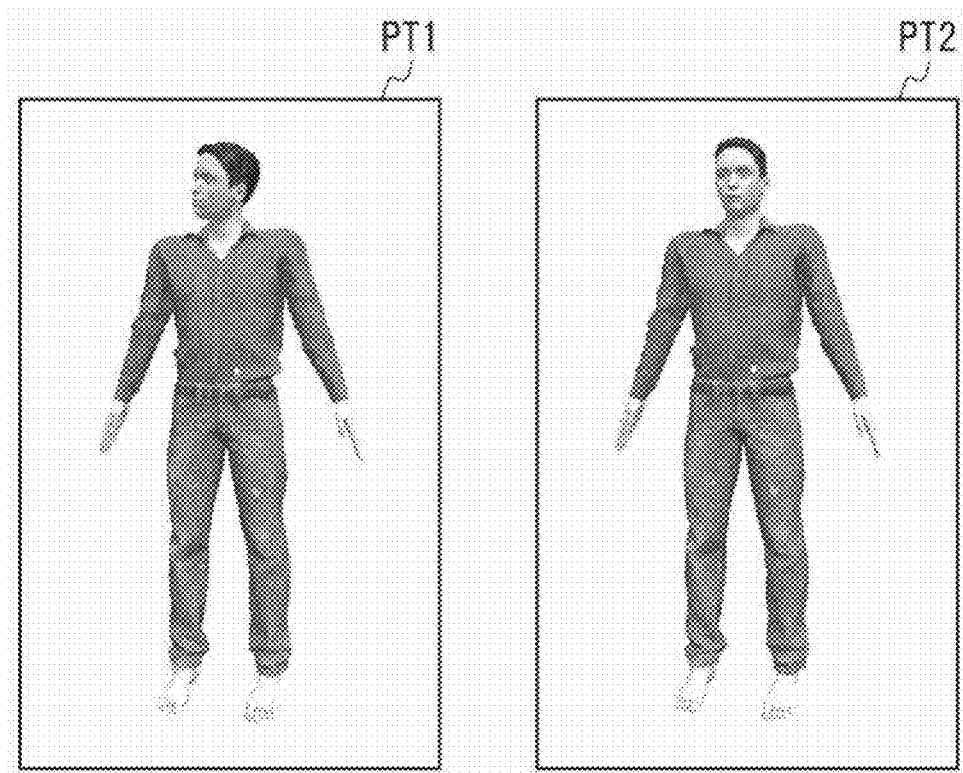
FIG. 5 is a diagram for explaining a normalized image.

The normalized image forming unit 43 extracts the "normalized image" from the captured image PH in which the line-draw group is detected by the processing by the key point detection unit 41 and the grouping unit 42. FIG. 5 is a diagram for explaining the normalized image. As described above, the captured image PH includes the image of the target to be determined DT1 and the image of the target to be determined DT2. Therefore, as shown in FIG. 5, two normalized images PT1 and PT2 are extracted from the captured image PI1. The normalized images PT1 and PT2 each include the "first image area" in which the target to be determined is shown and the "second image area" that surrounds the first image area, the target to be determined not being shown in the second image area. Each of the normalized image PT1 and the normalized image PT2 is used as the "image to be processed" in the image forming unit 44. In order to extract the normalized images PT1 and PT2, a "bounding box" that can be calculated based on the key points used in OpenPose may be used.

The image forming unit 44 forms the "feature extracted image" based on the plurality of predetermined "key points" of the target to be determined regarding the pose included in the "image to be processed" in a way similar to that in the image forming unit 11 according to the first embodiment.

As shown in FIG. 3, the image forming unit 44 includes a line-drawing unit 44A, a cropping unit 44B, and a paint unit 44C.

The line-drawing unit 44A forms the "texture map" using the image to be processed in a way similar to that in the line-drawing unit 11A according to the first embodiment. The method of forming the texture map will be explained later in detail.

The cropping unit 44B crops the "partial image" that includes a "first reference point" of the plurality of predetermined key points in its predetermined position, the "partial image" having the size that corresponds to the "predetermined size rule", from the texture map formed in the line-drawing unit 44A. The method of cropping the partial image will be explained later in detail.

The paint unit 44C forms the "feature extracted image" by painting a plurality of zones partitioned by a plurality of lines drawn by the line-drawing unit 44A by a plurality of respective colors in the partial image cropped by the cropping unit 44B. Each of the zones is defined by the positional relation with the plurality of lines drawn by the line-drawing unit 44A, and the color to be painted is determined in advance. The method of painting will be explained later in detail.

The feature extracted image thus formed may be used for supervised learning of the determination processing apparatus 50 or may be used for the determination of the pose of the target to be determined in the determination processing apparatus 50 after learning.

The determination processing apparatus 50 includes, for example, a neural network (not shown). The determination processing apparatus 50 performs supervised learning for the neural network using the feature extracted image formed in the image forming apparatus 40. Further, the determination processing apparatus 50 inputs the feature extracted image formed in the image forming apparatus 40 to the learned neural network, thereby determining (classifying) the pose of the target to be determined.

<Method of Forming Texture Map>

First, in order for the line-drawing unit 44A to form a texture map, the following conditions (condition I) need to be satisfied. That is, all the conditions that "in the image to be processed, both the key points k09 and k12 are available", "at least two of the key points k01, k02, and k05 are available", and "at least two of the key points k00, k16, and k17 are available" need to be satisfied. That is, it is possible that the feature extracted image formed based on the texture map without satisfying this condition may not be able to improve the accuracy of determining the pose.

Figure 6:
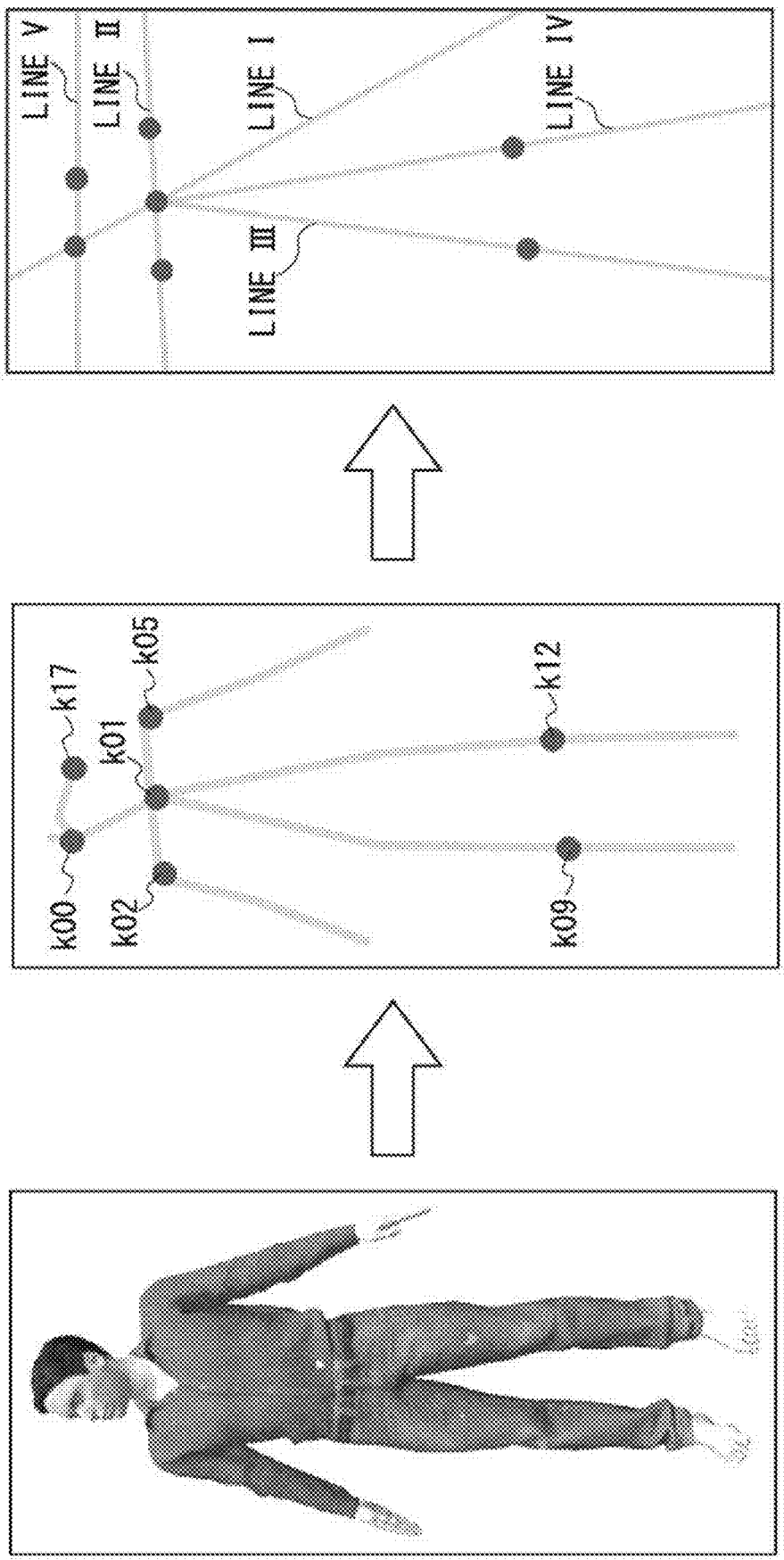
FIG. 6 is a diagram for explaining a method of forming a texture map.

The line-drawing unit 44A attempts to draw lines for each of the aforementioned line-draw group 1 to the line-draw group 5. FIG. 6 is a diagram for explaining the method of forming the texture map. In FIG. 6, the image to be processed is shown in the left and central parts and the texture map is shown in the right part.

That is, the line-drawing unit 44A draws the line that passes the key points k01 and k00 as a line I. The respective ends of this line I both extend to the end (edge) of the image to be processed. When the key point k01 is not available in the image to be processed, the midpoint between the key point k02 and the key point k05 is treated as the key point k01.

Further, the line-drawing unit 44A draws the line that passes the key points k01 and k02, the line that passes the key points k01 and k05, or the line that passes the key points k02 and k05 as a line II. These three lines are equivalent to one another since the key point k01 is defined to be the midpoint of the key point k02 and the key point k05. The respective ends of this line II both extend to the end (edge) of the image to be processed.

Further, the line-drawing unit 44A draws the line that passes the key points k01 and k09 as a line III. However, the line III exists only in the region under the line II. That is, the line III has one end that corresponds to the key point k01, extends from the key point k01 to the key point k09, and has the other end that corresponds to the end of the image to be processed.

Further, the line-drawing unit 44A draws the line that passes the key points k01 and k12 as a line IV. However, the line IV exists only in the region under the line II. That is, the line IV has one end that corresponds to the key point k01, extends from the key point k01 to the key point k12, and has the other end that corresponds to the end of the image to be processed.

Further, the line-drawing unit 44A draws a line V when only two of the key points k00, k16, and k17 are available. The line-drawing unit 44A draws the line that passes these two key points that are available as the line V. The respective ends of the line V both extend to the end of the image to be processed.

Figure 7:
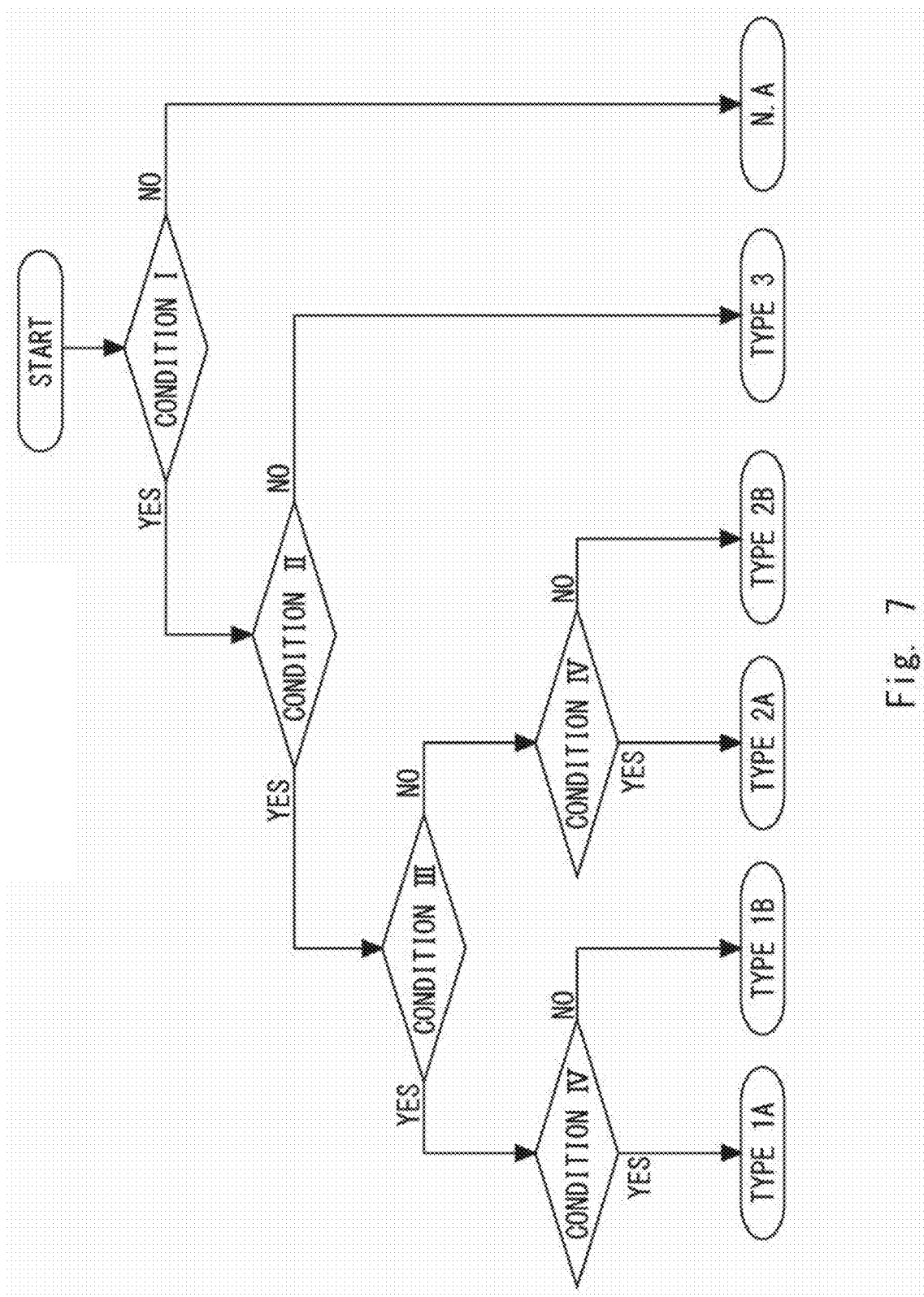
FIG. 7 is a diagram for explaining types of a texture map.

The texture map in which four or five lines are drawn can be classified into five types (types 1A, 1B, 2A, 2B, and 3) by three conditions (conditions II, III, and IV). FIG. 7 is a diagram for explaining the types of the texture map. The condition II is that "the line I is available". The condition III is that "the line V is available". The condition IV is that "the lines III and IV exist on the same side with respect to the line I". FIG. 6 shows an example of the type 1A. The type 1A corresponds to the "kyoro pose".

<Method of Cropping Partial Image>

Figure 8:
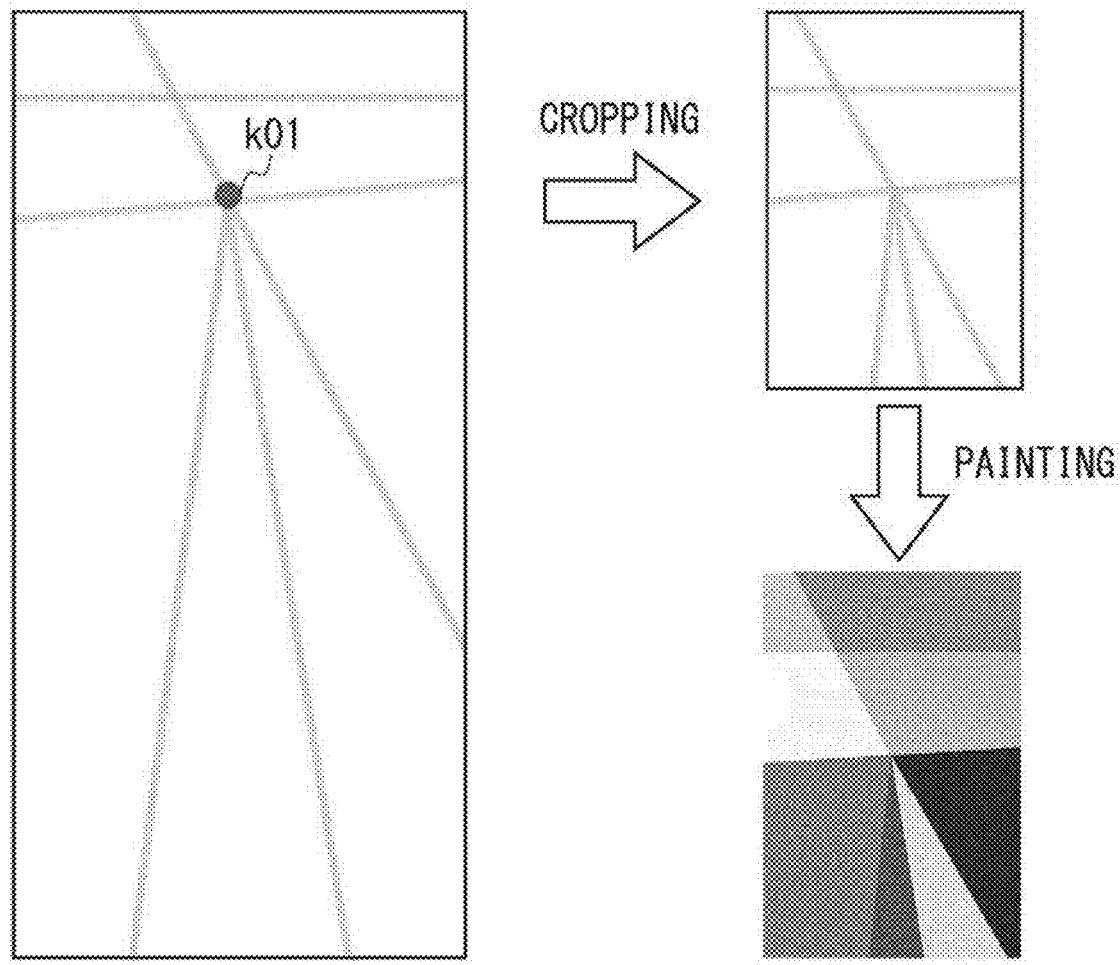
FIG. 8 is a diagram for explaining a method of cropping a partial image and a method of painting the partial image.

FIG. 8 is a diagram for explaining a method of cropping the partial image and a method of painting the partial image. FIG. 8 shows one example of the texture map, the partial image cropped from this texture map, and the feature extracted image in which the partial image is painted.

As described above, the cropping unit 44B crops the "partial image" including a "first reference point" of the plurality of predetermined key points in its predetermined position, the size of the "partial image" corresponding to a "predetermined size rule", from the texture map formed in the line-drawing unit 44A.

The cropping unit 44B crops, for example, the partial image from the texture map in accordance with the following rules. That is, these rules are "the key point k01 is made center in the partial image", "the height of the partial image (i.e., the vertical length) is twice as long as the distance from the upper end of the texture map to the key point k01", and "the ratio of the height to the width of the partial image (i.e., the horizontal length) is 3/2". These rules may be adjusted in order to improve the accuracy of determining the specific pose. That is, according to these rules, the key point k01 corresponds to the aforementioned "first reference point", and the center of the partial image corresponds to the aforementioned "predetermined position". Further, "the height of the partial image (i.e., the vertical length) is twice as long as the distance from the upper end of the texture map to the key point k01", and "the ratio of the height to the width of the partial image (i.e., the horizontal length) is 3/2" correspond to the aforementioned "predetermined size rule".

<Painting Method>

FIG. 9 is a diagram showing one example of a painting rule table. In the painting rule table shown in FIG. 9, the plurality of regions partitioned by four or five lines in the partial image are associated with information regarding the colors that paint the respective regions.

According to the painting rule table shown in FIG. 9, the paint unit 44C paints the zone that is under the line II and is next to the line I in the counterclockwise direction by the color whose color code is "#101010". Each of the zones under the line II corresponds one-to-one to with one color code. Further, the paint unit 44C paints the left zone of the line I, which is above the line II and the line V, by the color obtained by mixing the color whose color code is "#202020" and the color whose color code is "#A0A0A0".

Operation Example of Image Forming Apparatus

Figure 10:
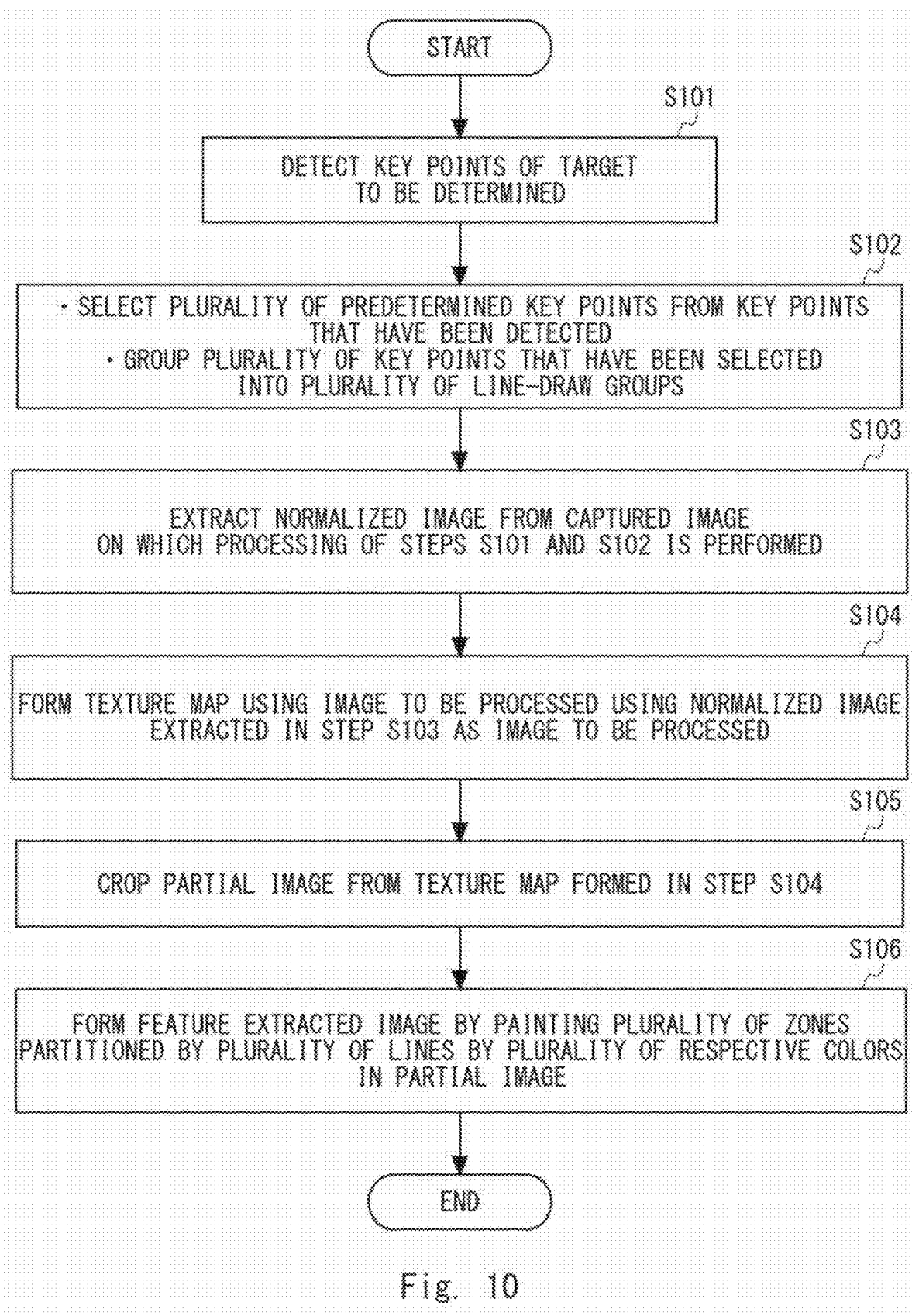
FIG. 10 is a flowchart showing one example of a processing operation of an image forming apparatus according to a second embodiment.

One example of the processing operation of the image forming apparatus that includes the aforementioned configuration will be explained. FIG. 10 is a flowchart showing one example of the processing operation of the image forming apparatus according to the second embodiment. The flow shown in FIG. 10 starts when the image forming apparatus 40 receives the captured image from the image-capturing apparatus 20.

In the image forming apparatus 40, the key point detection unit 41 detects the key points of the target to be determined in the captured image (Step S101).

The grouping unit 42 selects the plurality of predetermined key points from the key points that have been detected and groups the plurality of key points that have been selected into the plurality of line-draw groups (Step S102).

The normalized image forming unit 43 extracts the normalized image from the captured image on which the processing of Steps S101 and S102 is performed (Step S103).

The line-drawing unit 44A forms the texture map using the image to be processed using the normalized image extracted in Step S103 as the image to be processed (Step S104).

The cropping unit 44B crops the partial image from the texture map formed in the line-drawing unit 44A (Step S105).

The paint unit 44C forms the feature extracted image by painting the plurality of zones partitioned by the plurality of lines drawn by the line-drawing unit 44A by the plurality of respective colors in the partial image (Step S106).

As described above, the feature extracted image formed in the above process may be used for supervised learning of the determination processing apparatus 50 or may be used for determination of the pose of the target to be determined in the determination processing apparatus 50 after learning.

<Utility Test of Feature Extracted Image>

Figure 11:
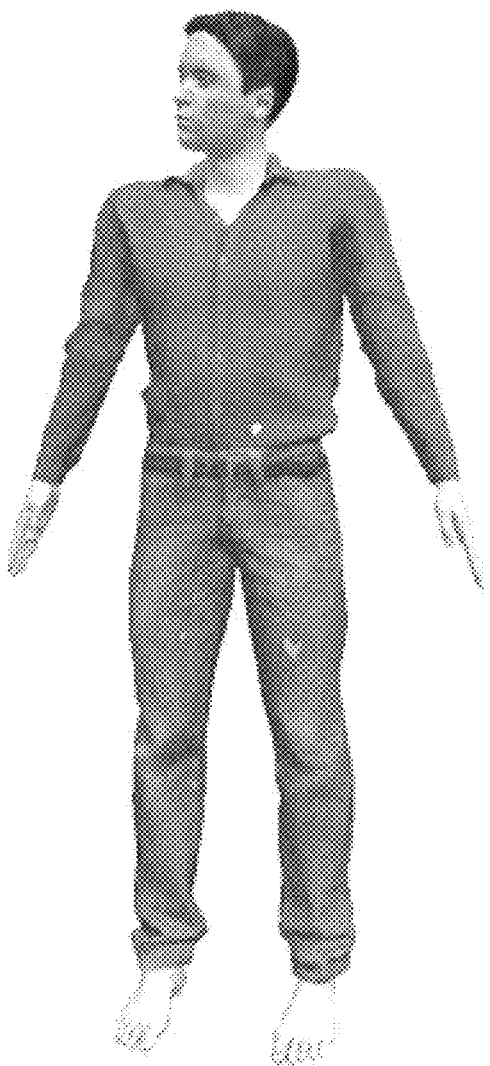
FIG. 11 is a diagram for explaining a person image and a positive label.
Figure 12:
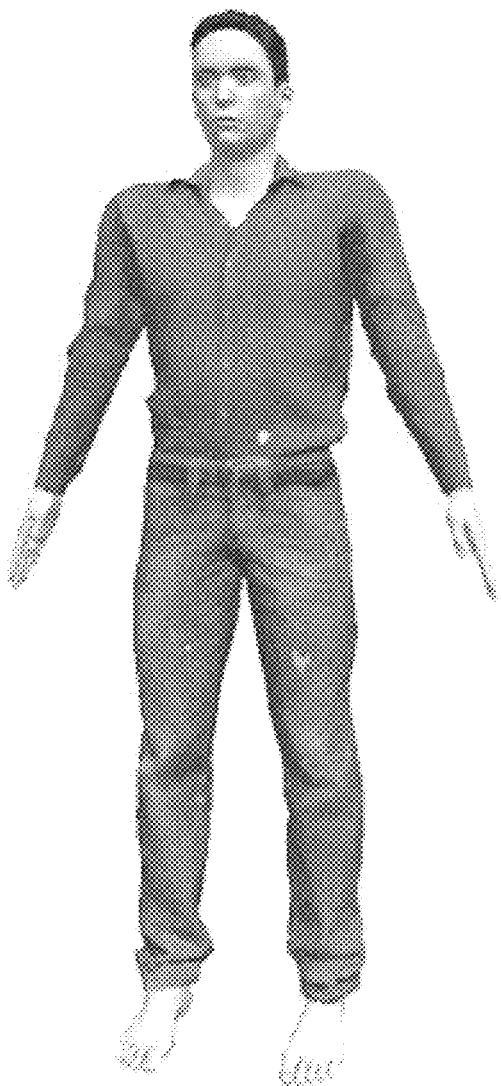
FIG. 12 is a diagram for explaining a person image and a negative label.
Figure 13:
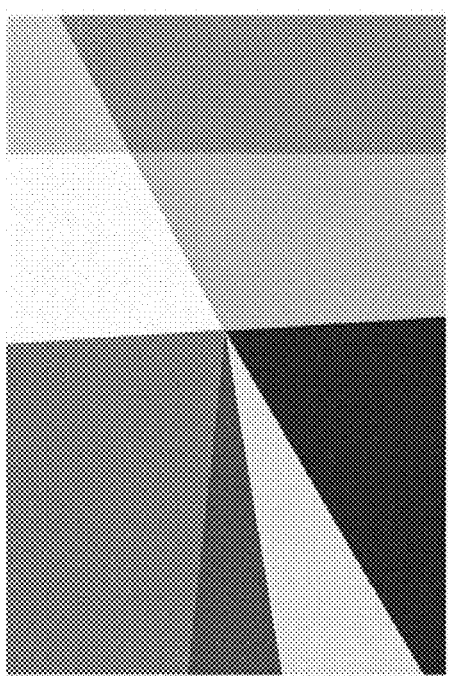
FIG. 13 is a diagram showing one example of a feature extracted image to which the positive label is attached.

The usefulness of the feature extracted images according to the second embodiment was tested throughout the determination (recognition) of "kyoro pose". First, 45000 captured images were prepared. These captured images were the ones captured by an RGB camera, and each of the captured images included an image of a real person. A positive label was attached to 25000 captured images in which the person's head orientation is different from body orientation and a negative label was attached to 20000 captured images in which the head orientation is substantially the same as the body orientation. That is, if the image of the person as shown in FIG. 11 is included in the captured image, the positive label is attached to this captured image. On the other hand, if the image of the person as shown in FIG. 12 is included in the captured image, the negative label is attached to this captured image. FIG. 11 is a diagram for explaining the person image and the positive label. FIG. 12 is a diagram for explaining the person image and the negative label.

Then the aforementioned feature extracted images were formed using the 45000 captured images thus prepared. FIG.

Figure 14:
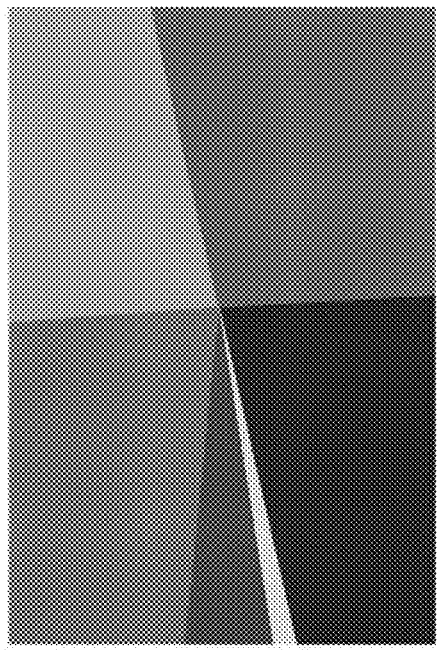
FIG. 14 is a diagram showing one example of a feature extracted image to which the negative label is attached.

13 shows a feature extracted image formed based on the captured image that includes the image of the person as shown in FIG. 11. Further, FIG. 14 shows a feature extracted image formed based on the captured image that includes the image of the person as shown in FIG. 12. In this way, a set of feature extracted images including 25000 feature extracted images to which the positive label is attached and 20000 feature extracted images to which the negative label is attached were obtained.

Learning was performed for one CNN (first CNN) of two CNNs having the same configuration using 45000 captured images themselves, and learning was performed for the other CNN (second CNN) of the two CNNs using the 45000 feature extracted images.

Then another 6000 captured images including 3000 captured images to which the positive label was attached and 3000 captured images to which the negative label was attached and 6000 feature extracted images formed from them were prepared.

Then the aforementioned other 6000 captured images were determined by the first CNN after learning. That is, the first CNN after learning was made to determine whether the pose of the image of the person included in each of the aforementioned other 6000 captured images is a kyoro pose. In a similar way, the aforementioned 6000 feature extracted images were determined by the second CNN after the learning.

As a result of the aforementioned test, the error rate of the determination by the first CNN after learning was 0.29 and the error rate of the determination by the second CNN after learning was 0.21. That is, the results indicating that the accuracy of determining the pose can be improved by using the aforementioned feature extracted image were obtained.

As described above, according to the second embodiment, in the image forming apparatus 40, the cropping unit 44B crops the "partial image" that includes the "first reference point" of the plurality of predetermined key points in its predetermined position, the "partial image" having the size that corresponds to the "predetermined size rule", from the texture map formed in the line-drawing unit 44A.

According to the configuration of the image forming apparatus 40, the normalized partial image can be formed.

Further, in the image forming apparatus 40, the paint unit 44C forms the feature extracted image by painting the plurality of zones partitioned by the plurality of lines drawn by the line-drawing unit 44A by the plurality of respective colors in the partial image cropped by the cropping unit 44B.

According to this image forming apparatus 40, it is possible to form the feature extracted image that contributes to improvement in the accuracy of detecting the pose. Note that the partial image before the painting may be used as the feature extracted image. However, by performing painting, the accuracy of determining the pose by the feature extracted image can be further improved compared to a case in which painting is not performed.

Other Embodiments

Figure 15:
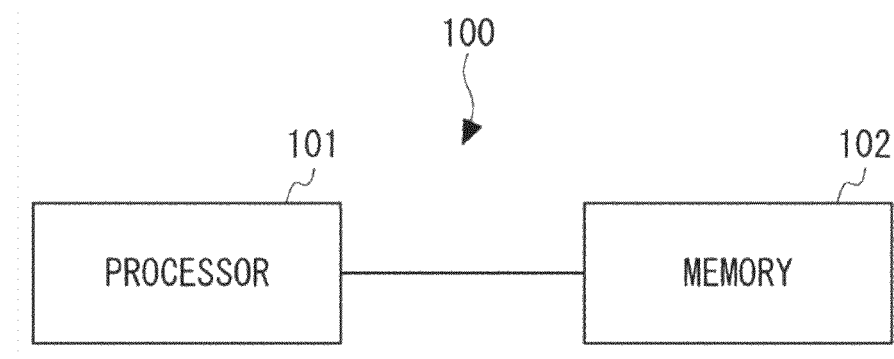
FIG. 15 is a diagram showing a hardware configuration example of the image forming apparatus.

FIG. 15 is a diagram showing a hardware configuration example of an image forming apparatus. In FIG. 15, an image forming apparatus 100 includes a processor 101 and a memory 102. The image forming units 11 and 44, the key point detection unit 41, the grouping unit 42, and the normalized image forming unit 43 of the image forming apparatuses 10 and 40 according to the first and second embodiments may be achieved by the processor 101 loading the program stored in the memory 102 and executing the loaded program. This program can be stored and provided to the image forming apparatuses 10 and 40 using any type of non-transitory computer readable media. Further, the program may be provided to the image forming apparatuses 10 and 40 using any type of transitory computer readable media.

While the present disclosure has been described above with reference to the embodiments, the present disclosure is not limited thereto. Various changes that may be understood by one skilled in the art may be made to the configuration and the details of the present disclosure.

The whole or part of the above embodiments can be described as, but not limited to, the following supplementary notes.

(Supplementary Note 1)

An image forming apparatus comprising:
  forming means for forming a feature extracted image based on a plurality of predetermined key points of a target to be determined included in an image to be processed including a first image area in which the target to be determined of a pose is shown and a second image area that surrounds the first image data, the target to be determined not being shown in the second image area,
  wherein the forming means comprises line-drawing means for drawing in the image to be processed, for each of a plurality of line-draw groups, each of the line-draw groups including at least two key points included in the plurality of predetermined key points, a line that passes the key points included in each of the line-draw groups and has at least one end that is extended to an end of the image to be processed, thereby forming a texture map.

(Supplementary Note 2)

The image forming apparatus according to Supplementary Note 1, wherein the forming means further comprises cropping means for cropping a partial image that includes a first reference point of the plurality of predetermined key points in its predetermined position and has a size that corresponds to a predetermined size rule from the texture map.

(Supplementary Note 3)

The image forming apparatus according to Supplementary Note 2, wherein the forming means further comprises painting means for painting a plurality of zones in the partial image partitioned by the plurality of lines by a plurality of respective colors, thereby forming the feature extracted image.

(Supplementary Note 4)

The image forming apparatus according to Supplementary Note 2 or 3, wherein
  the target to be determined is a human,
  each of the plurality of predetermined key points is classified into a head group that corresponds to a head part of the human, a body group that corresponds to a body of the human, and a leg group that corresponds to legs of the human, and
  the plurality of line-draw groups include a first line-draw group including a first key point included in the head group and the first reference point included in the body group.

(Supplementary Note 5)

The image forming apparatus according to Supplementary Note 4, wherein
  the head group includes a plurality of key points that correspond to a nose, a left ear, and a right ear, the body group includes a plurality of key points that correspond to a neck, a left shoulder, and a right shoulder, and the leg group includes a plurality of key points that correspond to a left knee and a right knee.

(Supplementary Note 6)

The image forming apparatus according to Supplementary Note 4 or 5, wherein the first key point is a key point that corresponds to a nose, and the first reference point is a key point that corresponds to a neck.

(Supplementary Note 7)

The image forming apparatus according to any one of Supplementary Notes 1 to 6, wherein the image to be processed is a normalized image extracted from a captured image in which the target to be determined is shown.

(Supplementary Note 8)

A determination apparatus comprising:

the image forming apparatus according to any one of Supplementary Notes 1 to 7; and determination means including a neural network and determining a pose of the target to be determined using the feature extracted image.

(Supplementary Note 9)

An image forming method comprising:

forming a feature extracted image based on a plurality of predetermined key points of a target to be determined included in an image to be processed including a first image area in which the target to be determined of a pose is shown and a second image area that surrounds the first image data, the target to be determined not being shown in the second image area, wherein forming the feature extracted image comprises drawing in the image to be processed, for each of a plurality of line-draw groups, each of the line-draw groups including at least two key points included in the plurality of predetermined key points, a line that passes the key points included in each of the line-draw groups and has at least one end that is extended to an end of the image to be processed, thereby forming a texture map.

(Supplementary Note 10)

The image forming method according to Supplementary Note 9, wherein forming the feature extracted image further comprises cropping a partial image that includes a first reference point of the plurality of predetermined key points in its predetermined position and has a size that corresponds to a predetermined size rule from the texture map.

(Supplementary Note 11)

The image forming method according to Supplementary Note 10, wherein forming the feature extracted image further comprises painting a plurality of zones in the partial image partitioned by the plurality of lines by a plurality of respective colors.

(Supplementary Note 12)

The image forming method according to Supplementary Note 10 or 11, wherein the target to be determined is a human, each of the plurality of predetermined key points is classified into a head group that corresponds to a head part of the human, a body group that corresponds to a body of the human, and a leg group that corresponds to legs of the human, and the plurality of line-draw groups include a first line-draw group including a first key point included in the head group and the first reference point included in the body group.

(Supplementary Note 13)

The image forming method according to Supplementary Note 12, wherein the head group includes a plurality of key points that correspond to a nose, a left ear, and a right ear, the body group includes a plurality of key points that correspond to a neck, a left shoulder, and a right shoulder, and the leg group includes a plurality of key points that correspond to a left knee and a right knee.

(Supplementary Note 14)

The image forming method according to Supplementary Note 12 or 13, wherein the first key point is a key point that corresponds to a nose, and the first reference point is a key point that corresponds to a neck.

(Supplementary Note 15)

The image forming method according to any one of Supplementary Notes 9 to 14, wherein the image to be processed is a normalized image extracted from a captured image in which the target to be determined is shown.

(Supplementary Note 16)

An non-transitory computer readable medium storing image forming program for causing an image forming apparatus to form a feature extracted image based on a plurality of predetermined key points of a target to be determined included in an image to be processed including a first image area in which the target to be determined of a pose is shown and a second image area that surrounds the first image data, the target to be determined not being shown in the second image area, wherein forming the feature extracted image comprises drawing in the image to be processed, for each of a plurality of line-draw groups, each of the line-draw groups including at least two key points included in the plurality of predetermined key points, a line that passes the key points included in each of the line-draw groups and has at least one end that is extended to an end of the image to be processed, thereby forming a texture map.

REFERENCE SIGNS LIST

10 IMAGE FORMING APPARATUS
11 FEATURE EXTRACTED IMAGE FORMING UNIT
11A LINE-DRAWING UNIT
20 IMAGE-CAPTURING APPARATUS
30 DETERMINATION APPARATUS
40 IMAGE FORMING APPARATUS
41 KEY POINT DETECTION UNIT
42 GROUPING UNIT
43 NORMALIZED IMAGE FORMING UNIT
44 FEATURE EXTRACTED IMAGE FORMING UNIT
44A LINE-DRAWING UNIT
44B CROPPING UNIT
44C PAINT UNIT
50 DETERMINATION PROCESSING APPARATUS (DETERMINATION MEANS)

The invention claimed is:

1. An image forming apparatus comprising:
at least one processor; and
at least one memory storing instructions executable by the at least one processor to:
for each of a plurality of training images of a training target including a first image area including the training target and a second image area surrounding the first image area and not including the training target:

detect, in the first image area of the training image, a plurality of predetermined key points;

select a plurality of line-draw groups in the training image, where each of the line-draw groups includes at least two key points of the plurality of predetermined key points;

form a texture map by drawing, for each of the line-draw groups, a line in the training image passing through the at least two key points included in the each of the line-draw groups and having at least one end that is extended to an end of the training image;

form a feature extracted image based on the texture map; and train a pose identification neural network based on a pose of the training target in each of the training images and the feature extracted image formed for each of the training images, wherein formation of the feature extracted image based on the texture map that has been formed improves pose identification accuracy in subsequent usage of the pose identification neural network.

2. The image forming apparatus according to claim 1, wherein the instructions are executable by the at least one processor to further:

for each training image, generate a partial image by cropping the training image, the partial image including a first reference point of the plurality of predetermined key points in a predetermined position and has a size that corresponds to a predetermined size rule from the texture map.

3. The image forming apparatus according to claim 2, wherein the instructions are executable by the at least one processor to further:

for each training image, paint a plurality of zones in the partial image as partitioned by the line of each of the line-draw groups, with a plurality of respective colors, to form the feature extracted image.

4. The image forming apparatus according to claim 2, wherein the target to be determined is a human, each of the plurality of predetermined key points is classified into a head group that corresponds to a head part of the human, a body group that corresponds to a body of the human, and a leg group that corresponds to legs of the human, and the plurality of line-draw groups include a first line-draw group including a first key point included in the head group and the first reference point included in the body group.

5. The image forming apparatus according to claim 4, wherein the head group includes those of the plurality of predetermined key points that correspond to a nose, a left ear, and a right ear, the body group includes those of the plurality of predetermined key points that correspond to a neck, a left shoulder, and a right shoulder, and the leg group includes those of the plurality of predetermined key points that correspond to a left knee and a right knee.

6. The image forming apparatus according to claim 4, wherein the first key point corresponds to a nose, and the first reference point corresponds to a neck.

7. The image forming apparatus according to claim 1, wherein each training image is a normalized image extracted from a corresponding captured image in which the training target is shown.

8. A determination apparatus comprising:

the image forming apparatus according to claim 1, and an apparatus including the pose identification neural network and that uses the pose identification neural network to perform pose identification.

9. The image forming apparatus according to claim 1, wherein the instructions are executable by the at least one processor to further:

receive an image of a target including the first image area including the target and the second image area surrounding the first image area and not including the target;

detect, in the first image area of the image, the plurality of predetermined key points;

select the plurality of line-draw groups in the image that each include the at least two key points of the plurality of predetermined key points;

form the texture map by drawing, for each of the line-draw groups, the line in the image passing through the at least two key points included in the each of the line-draw groups and having at least the end that is extended to the end of the image;

form the feature extracted image based on the texture map; and apply the pose identification neural network as has been trained to the feature extracted image to identify the pose of the target in the image.

10. An image forming method comprising:

for each of a plurality of training images of a training target including a first image area including the training target and a second image area surrounding the first image area and not including the training target:

detecting, by a processor and in the first image area of the training image, a plurality of predetermined key points;

selecting, by the processor, a plurality of line-draw groups in the training image, where each of the line-draw groups includes at least two key points of the plurality of predetermined key points;

forming, by the processor, a texture map by drawing, for each of the line-draw groups, a line in the training image passing through the at least two key points included in the each of the line-draw groups and having at least one end that is extended to an end of the training image;

forming, by the processor, a feature extracted image based on the texture map; and training, by the processor, a pose identification neural network based on a pose of the training target in each of the training images and the feature extracted image formed for each of the training images, wherein formation of the feature extracted image based on the texture map that has been formed improves pose identification accuracy in subsequent usage of the pose identification neural network.

11. The image forming method according to claim 10, further comprising:

for each training image, generating, by the processor, a partial image by cropping the training image, the partial image including a first reference point of the plurality of predetermined key points in a predetermined position and has a size that corresponds to a predetermined size rule from the texture map.

12. The image forming method according to claim 11, further comprising:

for each training image, painting a plurality of zones in the partial image as partitioned by the line of each of the line-draw groups, with a plurality of respective colors to form the feature extracted image.

13. The image forming method according to claim 11, wherein
the target to be determined is a human,
each of the plurality of predetermined key points is classified into a head group that corresponds to a head part of the human, a body group that corresponds to a body of the human, and a leg group that corresponds to legs of the human, and
the plurality of line-draw groups include a first line-draw group including a first key point included in the head group and the first reference point included in the body group.

14. The image forming method according to claim 13, wherein
the head group includes those of the plurality of predetermined key points that correspond to a nose, a left ear, and a right ear,
the body group includes those of the plurality of predetermined key points that correspond to a neck, a left shoulder, and a right shoulder, and
the leg group includes those of the plurality of predetermined key points that correspond to a left knee and a right knee.

15. The image forming method according to claim 13, wherein
the first key point corresponds to a nose, and
the first reference point corresponds to a neck.

16. The image forming method according to claim 10, wherein each training image is a normalized image extracted from a corresponding captured image in which the training target is shown.

17. The image forming method according to claim 10, further comprising:
receiving, by the processor, an image of a target including the first image area including the target and the second image area surrounding the first image area and not including the target;
detecting, by the processor and in the first image area of the image, the plurality of predetermined key points;
selecting, by the processor, the plurality of line-draw groups in the image that each include the at least two key points of the plurality of predetermined key points;
forming, by the processor, the texture map by drawing, for each of the line-draw groups, the line in the image passing through the at least two key points included in the each of the line-draw groups and having at least the end that is extended to the end of the image;
forming, by the processor, the feature extracted image based on the texture map; and
applying, by the processor, the pose identification neural network as has been trained to the feature extracted image to identify the pose of the target in the image.

18. An non-transitory computer readable medium storing an image forming program executable by an image forming apparatus to:
for each of a plurality of training images of a training target including a first image area including the training target and a second image area surrounding the first image area and not including the training target: detect, in the first image area of the training image, a plurality of predetermined key points;
select a plurality of line-draw groups in the training image, where each of the line-draw groups includes at least two key points of the plurality of predetermined key points;
form a texture map by drawing, for each of the line-draw groups, a line in the training image passing through the at least two key points included in the each of the line-draw groups and having at least one end that is extended to an end of the training image;
form a feature extracted image based on the texture map; and
train a pose identification neural network based on a pose of the training target in each of the training images and the feature extracted image formed for each of the training images, wherein formation of the feature extracted image based on the texture map that has been formed improves pose identification accuracy in subsequent usage of the pose identification neural network.

19. The non-transitory computer-readable medium according to claim 18, wherein the image forming program is executable by the image forming apparatus to further:
receive an image of a target including the first image area including the target and the second image area surrounding the first image area and not including the target;
detect, in the first image area of the image, the plurality of predetermined key points;
select the plurality of line-draw groups in the image that each include the at least two key points of the plurality of predetermined key points;
form the texture map by drawing, for each of the line-draw groups, the line in the image passing through the at least two key points included in the each of the line-draw groups and having at least the end that is extended to the end of the image;
form the feature extracted image based on the texture map; and
apply the pose identification neural network as has been trained to the feature extracted image to identify the pose of the target in the image.

* * * * *